(12) United States Patent
Bae (10) Patent No.: US 7,265,797 B2
(45) Date of Patent: Sep. 4, 2007

(54) TUNER CAPABLE OF RECEIVING ANALOG AND DIGITAL BROADCASTING SIGNAL AND INTEGRATED DTV HAVING THE TUNER, AND A BROADCASTING SIGNAL RECEIVING METHOD THEREOF

(75) Inventor: Simon Bae, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 556 days.

(21) Appl. No.: 10/924,988

(22) Filed: Aug. 25, 2004

(65) Prior Publication Data

US 2005/0057698 A1    Mar. 17, 2005

(30) Foreign Application Priority Data

Sep. 15, 2003    (KR)    ............ 10-2003-0063841

(51) Int. Cl.
*H04N 5/46*    (2006.01)
*H04N 5/44*    (2006.01)
*H04N 5/50*    (2006.01)

(52) U.S. Cl. ............ 348/732; 348/731; 348/725; 348/569; 348/555; 725/38; 725/59

(58) Field of Classification Search ............ 348/732, 348/725, 729, 731, 720, 569, 570, 567, 558, 348/554, 555, 553; 455/179.1, 185.1; 725/38, 725/59
See application file for complete search history.

(56) References Cited

U.S. PATENT DOCUMENTS

| 6,317,168 | B1 * | 11/2001 | Seo ............ 348/725 |
| 6,452,638 | B1 * | 9/2002 | Oku et al. ............ 348/441 |
| 6,483,547 | B1 * | 11/2002 | Eyer ............ 348/473 |
| 6,486,925 | B1 * | 11/2002 | Ko ............ 348/731 |
| 6,598,233 | B1 * | 7/2003 | Choi ............ 725/151 |
| 6,600,522 | B1 * | 7/2003 | Kim ............ 348/732 |
| 6,691,311 | B1 * | 2/2004 | Yata et al. ............ 725/68 |
| 6,714,264 | B1 * | 3/2004 | Kempisty ............ 348/732 |
| 6,741,293 | B1 * | 5/2004 | Obuchi ............ 348/554 |
| 6,924,848 | B2 * | 8/2005 | Onomatsu ............ 348/732 |
| 7,017,177 | B1 * | 3/2006 | Funakoshi ............ 725/118 |
| 7,027,108 | B2 * | 4/2006 | Kim ............ 348/732 |
| 7,030,933 | B2 * | 4/2006 | Takagi et al. ............ 348/569 |
| 7,050,118 | B2 * | 5/2006 | Okada et al. ............ 348/731 |

(Continued)

FOREIGN PATENT DOCUMENTS

JP    2000-184307 A    6/2000

(Continued)

*Primary Examiner*—David Ometz
*Assistant Examiner*—Jean W. Désir
(74) *Attorney, Agent, or Firm*—Sughrue Mion, PLLC (57) ABSTRACT

An integrated digital television for both analog and digital broadcasting can decide in accordance with a selection made by a user whether to receive the analog broadcasting signal. The integrated digital television provides menus through an option setting unit to select whether to search the frequency bandwidths where the analog broadcasting signals are transmitted, and if a selection is made on the menus for an item of 'no-search' for the frequency bandwidths of the analog broadcasting signals, the integrated digital television searches only the frequency bandwidths at which the digital broadcasting signals are transmitted. As a result, storing and shifting channels can be performed efficiently.

9 Claims, 5 Drawing Sheets

U.S. PATENT DOCUMENTS

| | | | |
|---|---|---|---|
| 7,061,542 B1 * | 6/2006 | Ikeguchi | 348/558 |
| 7,092,044 B2 * | 8/2006 | Inui et al. | 348/732 |
| 7,116,377 B2 * | 10/2006 | Zeidler et al. | 348/569 |
| 7,158,190 B2 * | 1/2007 | Ikeguchi | 348/731 |
| 7,196,732 B2 * | 3/2007 | Inai | 348/569 |
| 2003/0101453 A1 * | 5/2003 | Matsuyama et al. | 725/40 |

FOREIGN PATENT DOCUMENTS

| | | | |
|---|---|---|---|
| JP | 2001-230689 | * | 8/2001 |
| KR | 1999-085277 A | | 12/1999 |
| KR | 2000-027431 A | | 5/2000 |
| KR | 2003-0067991 A | | 8/2003 |

* cited by examiner

TUNER CAPABLE OF RECEIVING ANALOG AND DIGITAL BROADCASTING SIGNAL AND INTEGRATED DTV HAVING THE TUNER, AND A BROADCASTING SIGNAL RECEIVING METHOD THEREOF

CROSS-REFERENCE TO RELATED APPLICATIONS

This application claims the benefit of Korean Patent Application No. 2003-63841 filed Sep. 15, 2003, in the Korean Intellectual Property Office, the disclosure of which is incorporated herein by reference.

BACKGROUND

1. Field of the Invention

The present invention relates to a digital television, and more particularly, to an integrated digital television having a tuner which is capable of receiving both an analog broadcasting signal and a digital broadcasting signal, and a broadcasting signal receiving method thereof.

2. Description of the Related Art

Thanks to the advancement in digital technology, broadcasting companies, which used to depend on analog signals, are now able to transmit digital signals, and also, transmission of digital broadcasting signals using satellites is widely used in the related fields. Although the use of digital signals has rapidly spread, it doesn't mean that the analog signals are not used any more, but rather, there is a transition period in which both the digital and the analog signals are used for broadcasting.

During such a transition period, a television receiver which is capable of receiving both the analog and digital signals, is required, and in order to meet such a demand, a digital television having a tuner for receiving both the analog and digital broadcasting signals was developed.

Figure 1:
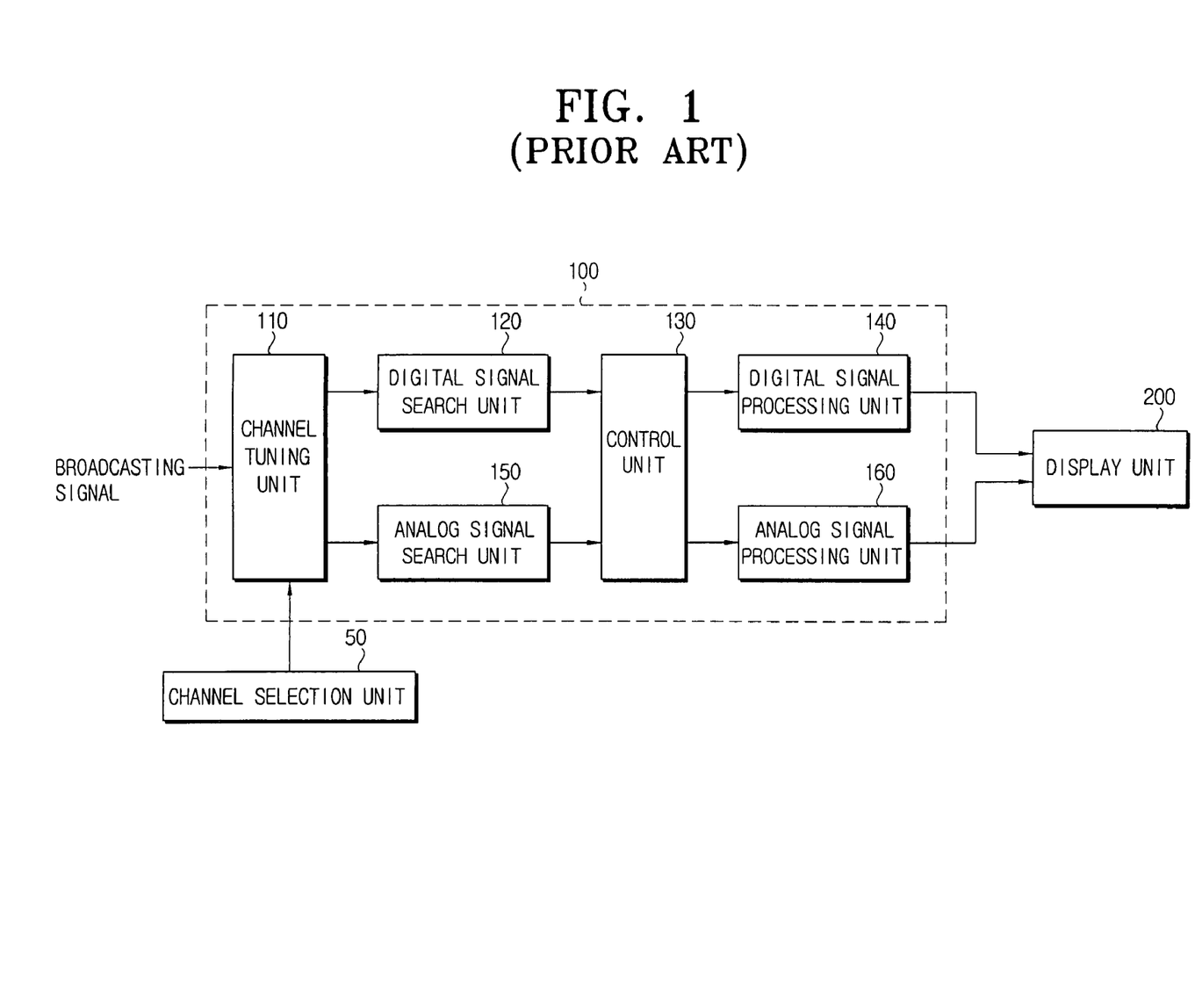
FIG. 1 is a schematic block diagram of a conventional integrated digital television.

FIG. 1 is a schematic block diagram of a conventional integrated digital television. Referring to FIG. 1, the integrated digital television comprises a channel selection unit 50, a broadcasting signal processing unit 100 and a display unit 200. The broadcasting signal processing unit 100 comprises a channel tuning unit 110, a digital signal search unit 120, a control unit 130, a digital signal processing unit 140, an analog signal search unit 150 and an analog signal processing unit 160.

The channel selection unit 50 comprises a plurality of input keys (not shown), and enables a user to select at least one among the plurality of broadcasting channels. The broadcasting signal processing unit 100 receives a signal about a channel selection which is made by the user through the channel selection unit 50. The channel tuning unit 110 receives a broadcasting signal from a broadcasting channel which corresponds to the received channel selection signal.

The digital signal search unit 120 searches to determine whether the broadcasting signal received by the channel tuning unit 120 is digital. If the received signal is determined to be digital by the digital signal search unit 120, the control unit 130 fixes the received broadcasting signals at a digital mode, and transmits the received broadcasting signals to the digital signal processing unit 140.

Accordingly, the digital signal processing unit 140 performs a digital signal processing to display the received broadcasting signals through the display unit 200. The digital signal processing includes the processes such as RGB color signal conversion with respect to image signal, decoding of compressed image signal, and removal of noise from broadcasting signals.

If the broadcasting signal being received by the channel tuning unit 110 is determined to be non-digital, the analog signal search unit 150 searches to see whether the broadcasting signal being received by the channel tuning unit 110 is analog. If the received signal is determined to be analog by the analog signal search unit 150, the control unit 130 fixes the received broadcasting signals at an analog mode, and transmits the received broadcasting signals to the analog signal processing unit 160.

The analog signal processing unit 160 performs an analog signal processing to display the received broadcasting signal through the display unit 200. The analog signal processing includes the processes such as RGB color signal conversion, and removal of noise from broadcasting signal.

If the received signal is determined to be non-analog, the control unit 130 fixes the status of the broadcasting signal at an analog mode, and displays through the display unit 200 a 'no-signal' state to indicate that the broadcasting signal is not received currently. The 'no-signal' state generally refers to a screen adjustment state.

The integrated digital television as described above efficiently matches the frequency ranges of the received digital and analog broadcasting signals to corresponding channels, and stores the corresponding channel in a memory, and therefore, is capable of rapidly tuning to the corresponding frequency range in accordance with the channel selected by the user.

Figure 2:
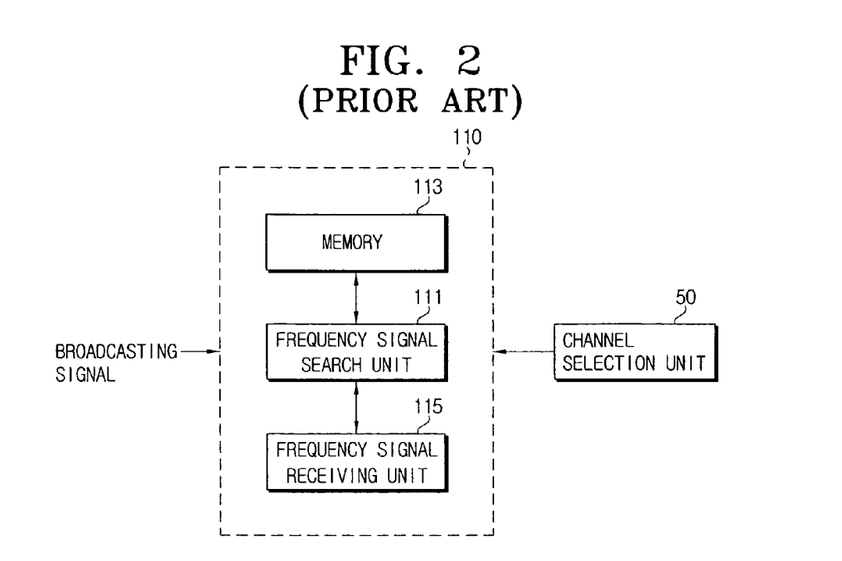
FIG. 2 is a schematic block diagram of the channel tuning unit of FIG. 1.

FIG. 2 is a schematic block diagram of the channel tuning unit of FIG. 1. Referring to FIG. 2, the channel tuning unit 110 comprises a frequency signal search unit 111, a memory 113 and a frequency signal receiving unit 115.

When the channel selection signal by the user is received through the channel selection unit 50, the frequency signal search unit 111 searches to determined whether the memory 113 stores a frequency signal corresponding to the channel selection signal. The memory 113 stores frequency signals corresponding to the plurality of broadcasting signals from different broadcasting stations. And generally, the integrated digital television is provided with an automatic channel search function. Accordingly, in accordance with the selection on the automatic channel search function, the frequency signal search unit 111 searches all the frequency signals of the digital and analog broadcasting signals as received, and synchronizes the searched frequency signals to corresponding channel selection signals. The frequency signals being synchronized to the respective channel selection signals are stored to the memory 113. The automatic channel search function can be used when the customer purchases the integrated digital television, or may be used later as need arises.

When the channel selection signal by the user is received through the channel selection unit 50, if a pre-stored frequency signal corresponding to the channel selection signal is searched from the memory 113, the frequency signal receiving unit 115 receives the broadcasting signal of the frequency signal which is synchronized to the pre-stored frequency signal of the memory 113. The broadcasting signal received by the frequency signal receiving unit 115 is converted into intermediate frequency (IF) and outputted.

In the conventional integrated digital television, the frequency signal search unit 111 has to search all the frequency signals of the broadcasting signals including digital and analog signals whenever the user selects an automatic channel search function. However, searching all the broadcasting signals may be unnecessary when the user wants to receive a digital broadcasting signal only, or in the future, if the transmission of analog broadcasting signals is not in service anymore.

SUMMARY

In an effort to overcome the problems as mentioned above, it is an aspect of the present invention to provide an integrated digital television having a tuner, which is capable of selectively receiving digital broadcasting signals only upon selection by a user, or receiving both the digital and analog broadcasting signals, and a broadcasting signal receiving method of the same.

The above aspects and/or other features of the present invention can substantially be achieved by providing an integrated digital television for receiving an analog broadcasting signal and a digital broadcasting signal, comprising: a channel tuning unit; and a broadcasting signal processing unit, the channel tuning unit comprising, an option setting unit for providing menus for selecting whether to search a frequency bandwidth at which the analog broadcasting signal is transmitted, a frequency signal search unit, which searches entire frequency bandwidths at which the digital broadcasting signal is transmitted when the selection is made among the menus provided by the option setting unit for a no-search on the frequency bandwidth of the analog broadcasting signal, a storage unit for, among the frequency bandwidths searched by the frequency signal search unit, storing a frequency signal of respective broadcasting channels through which the digital broadcasting signal is transmitted, and a broadcasting signal receiving unit for receiving the digital broadcasting signal of the frequency signal which matches with the frequency signal selected by a user among the frequency signals stored in the storage unit; and the broadcasting signal processing unit processing the digital broadcasting signal received at the broadcasting signal receiving unit of the channel tuning unit and displaying the processed signal through a display.

A channel selection unit may be further provided for receiving a selection command for selecting one broadcasting channel among a plurality of broadcasting channels, and transmitting a frequency signal corresponding to the selected broadcasting channel to the channel tuning unit.

According to one aspect of the present invention, a tuner for receiving an analog broadcasting signal and a digital broadcasting signal, comprises an option setting unit for providing menus for selecting whether to search a frequency bandwidth at which the analog broadcasting signal is transmitted; a frequency signal search unit for, with a selection on the menus provided by the option setting unit for a menu of no-search for the frequency bandwidth of the analog broadcasting signal, searching entire frequency bandwidths at which the digital broadcasting signal is transmitted; a storage unit for storing respective frequency signals of the broadcasting channels for the digital broadcasting signal among the frequency bandwidths selected by the frequency signal search unit and at which the digital broadcasting signal is stored; and a broadcasting signal receiving unit for receiving the digital broadcasting signal of the frequency signal which is selected by the user among the frequency signals of the digital broadcasting signals stored at the storage unit.

According to a first embodiment of the present invention, a broadcasting signal receiving method for an integrated digital television which is capable of receiving an analog broadcasting signal and a digital broadcasting signal and receiving a certain type of broadcasting signal which is synchronized to a frequency signal selected by a user, the method comprising the steps of: (a) providing menus for selecting whether or not to search a frequency bandwidth at which the analog broadcasting signal is transmitted, and with the selection on the menus for a 'no-search' menu with respect to the frequency bandwidth of the analog bandwidth, searching all the frequency bandwidths at which receivable digital broadcasting signals are transmitted; and (b) among the frequency bandwidths being searched in the step (a), storing a frequency signal of a broadcasting channel through which the digital broadcasting signal is transmitted, wherein among the frequency signal being stored, the digital broadcasting signal, which corresponds to a frequency signal matching with the frequency signal selected by the user, is received.

According to a second embodiment of the present invention, a broadcasting signal receiving method for an integrated digital television which is capable of receiving analog broadcasting signals and digital broadcasting signals and receiving a certain type of broadcasting signal which is synchronized to a frequency signal selected by a user, the method comprising the steps of: (a) selecting one among a plurality of broadcasting channels for transmitting the analog broadcasting signal and the digital broadcasting signal; (b) determining whether a reception of the analog broadcasting signal is selected through an option setting unit which provides menus for selecting whether or not to receive the analog broadcasting signal; and (c) determining whether a frequency signal corresponding to the selected broadcasting channel is set. According to the determination of steps (b) and (c), whether or not to search a frequency bandwidth of the analog broadcasting signal and/or the digital broadcasting signal is decided, and according to the decision, receiving a broadcasting signal which corresponds to the frequency signal of the selected broadcasting channel.

The step (b) determines that the reception of the analog broadcasting signal is not selected, and the step (c) determines that there is no frequency signal being set in correspondence with the selected broadcasting channel, further comprising the step of searching all the frequency bandwidths of the digital broadcasting signal for a frequency signal that corresponds to the selected broadcasting channel and receiving a broadcasting signal set corresponding to the searched frequency signal.

According to the second embodiment of the present invention, when the step (b) determines that the reception of the analog broadcasting signal is not selected and the step (c) determines that there is a frequency signal being set in correspondence with the selected broadcasting channel, further comprising the step of receiving a broadcasting signal set corresponding to the set frequency signal.

According to the second embodiment of the present invention, when the step (b) determines that the reception of the analog broadcasting signal is selected and the step (c) determines that there is no frequency signal being set in correspondence with the selected broadcasting channel, further comprising the step of searching all the frequency bandwidths of the analog broadcasting signal and the digital broadcasting signal for a frequency signal which corresponds to the selected broadcasting channel, and receiving a broadcasting signal which corresponds to the searched frequency signal.

According to the second embodiment of the present invention, when the step (b) determined that the reception of the analog broadcasting signal is selected and the step (c) determines that there is a frequency signal being set in correspondence with the selected broadcasting channel, further comprising the step of receiving a broadcasting signal which corresponds to the set frequency signal.

As a result, an integrated digital television and tuner can receive broadcasting signals according to the selection by the user.

BRIEF DESCRIPTION OF THE DRAWINGS

The above aspects and other features of the present invention will become more apparent by describing in detail exemplary embodiments thereof with reference to the attached drawings, in which.

DETAILED DESCRIPTION OF THE ILLUSTRATIVE, NON-LIMITING EMBODIMENTS

Hereinafter, the present invention will be described in detail with reference to the accompanying drawings.

Figure 3:
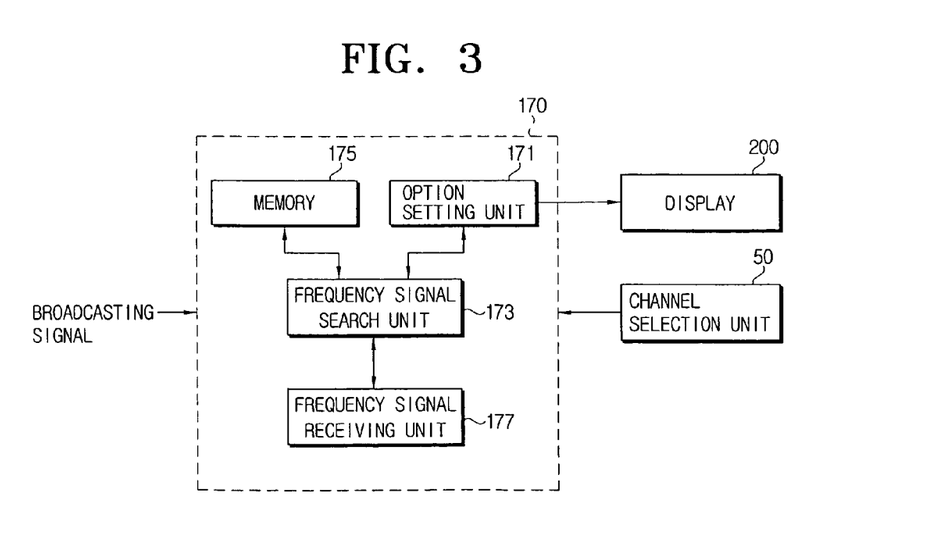
FIG. 3 is a schematic block diagram of a tuner according to an embodiment of the present invention.

FIG. 3 is a schematic block diagram of a tuner according to the present invention. Referring to FIG. 3, the tuner 170 according to the present invention comprises an option setting unit 171, a frequency signal search unit 173, a memory 175 and a frequency signal receiving unit 177.

The option setting unit 171 provides a menu for selecting whether to search the frequency range where the analog broadcasting signals are transmitted. In Korea, for example, frequency allocation of 30-300 MHz of VHF (very high frequency) and 300-3000 MHz of UHF (ultra high frequency), is used. Among the allocated broadcasting channels, the digital broadcasting signal utilizes a bandwidth which is not used for the analog signals. The option setting unit 171 provides a menu for selecting whether to search all the frequency bandwidths for analog and digital broadcasting signals, or to search the frequency bandwidth of the digital broadcasting signal only.

When the menu of non-search for the frequency bandwidth of analog broadcasting signals is selected through the option setting unit 171, i.e., when it is selected that only the frequency bandwidth of the digital broadcasting signals, the frequency signal search unit 173 searches among the allocated frequency bandwidths for a frequency bandwidth through which the digital broadcasting signals are transmitted.

Among the frequency bandwidths as searched by the frequency signal search unit 173, the memory 175 stores therein frequency signals which correspond to the digital broadcasting channels. For example, if it is assumed that the frequency signal for a channel 14 for digital broadcasting signals as searched by the frequency signal search unit 173 is 350 MHz, and the frequency signal for another channel 16 for digital broadcasting signals is 360 MHz, the memory 175 stores therein 350 MHz corresponding to the channel 14, and also 360 MHz corresponding to the channel 16.

The broadcasting signal receiving unit 177 receives a digital broadcasting signal of a frequency signal which matches with one among the frequency signals which is selected by the user among the frequency signals stored in the memory 175. The frequency signal selection by the user will be described later in greater detail.

Figure 4:
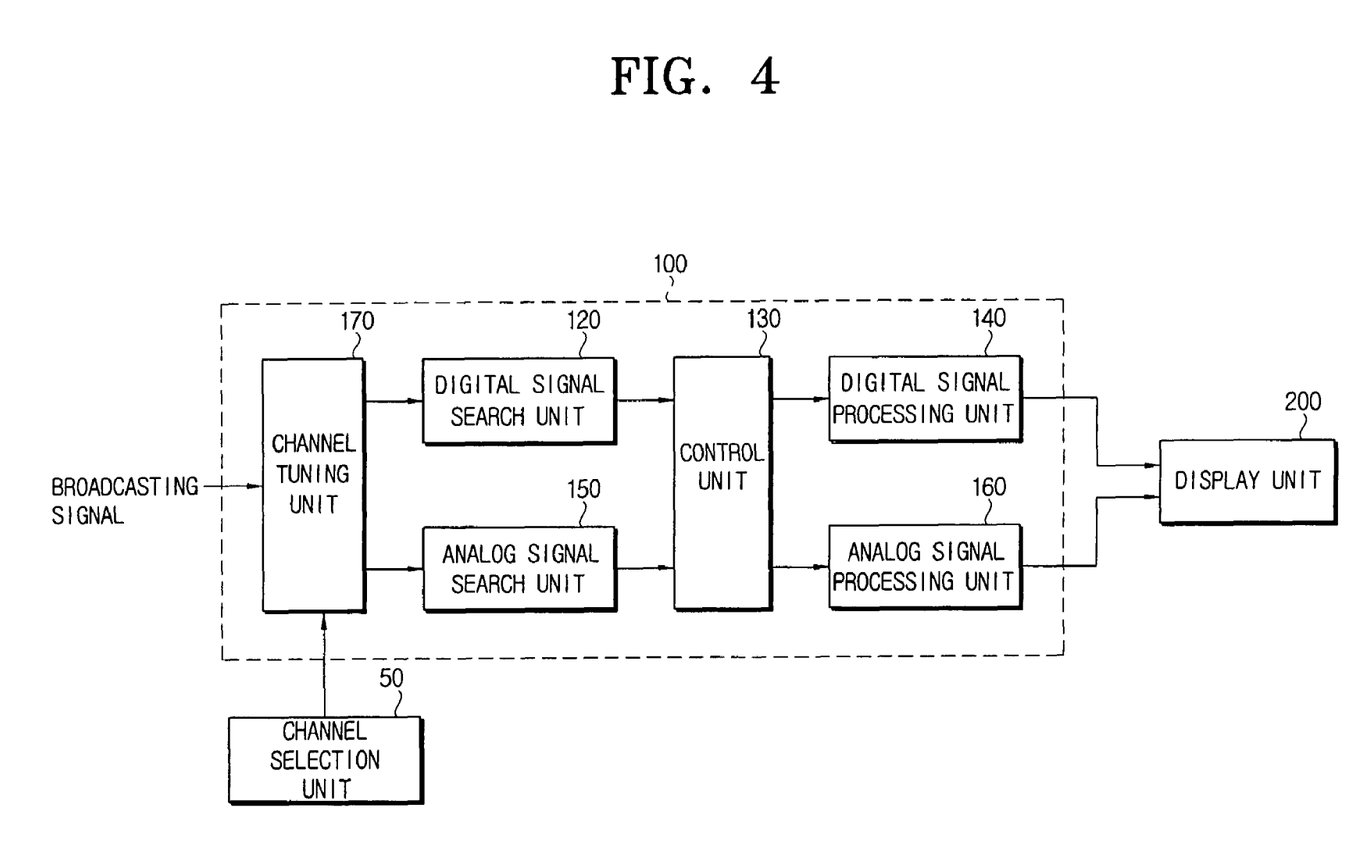
FIG. 4 is a schematic block diagram of an integrated digital television according to an embodiment of the present invention.

FIG. 4 is a schematic block diagram of an integrated digital television according to the present invention. According to the present invention, the integrated digital television comprises a channel selection unit 50, a broadcasting signal processing unit 100 and a display unit 200. The broadcasting signal processing unit 100 comprises a channel tuning unit 170, a digital signal search unit 120, a control unit 130, a digital signal processing unit 140, an analog signal search unit 150 and an analog signal processing unit 160. The channel tuning unit 170 has the same function and construction as that described above, and accordingly, it is referred to by the same reference numeral. Likewise, the digital signal search unit 120, the control unit 130, the digital signal processing unit 140, the analog signal search unit 150 and the analog signal processing unit 160, having the same function and construction as those of the integrated digital television of FIG. 1, will also be referred to by the same reference numerals, and detailed description regarding the operation and function thereof will be omitted.

The channel selection unit 50 comprises a plurality of input keys (not shown), and receives a selection command from a user to select one among the plurality of broadcasting channels. When a certain broadcasting channel is selected by the user, the channel selection unit 50 transmits a frequency signal corresponding to the selected broadcasting channel to the channel tuning unit 170. The channel selection unit 50 may be realized in the form of a key input unit (not shown) usually provided at a body of the integrated digital television, or a remote controller (not shown) which controls the integrated digital television from a remote distance.

Among the frequency signals being stored in the memory 175 for the respective digital broadcasting signals, the broadcasting signal receiving unit 177 of the channel tuning unit 170 receives a digital broadcasting signal of the frequency signal which matches with the frequency signal as received from the channel selection unit 50.

Accordingly, when the user wants to receive digital broadcasting signals only, or in the future, when the transmission of analog broadcasting signals is not in service anymore, the tuner 170 or the integrated digital television according to the present invention can rapidly perform search, because it only searches the frequency bandwidth where the digital broadcasting signals are transmitted, instead of searching all the frequency bandwidths of the available broadcasting channels. Accordingly, storing and shifting channels is performed rapidly.

Figure 5:
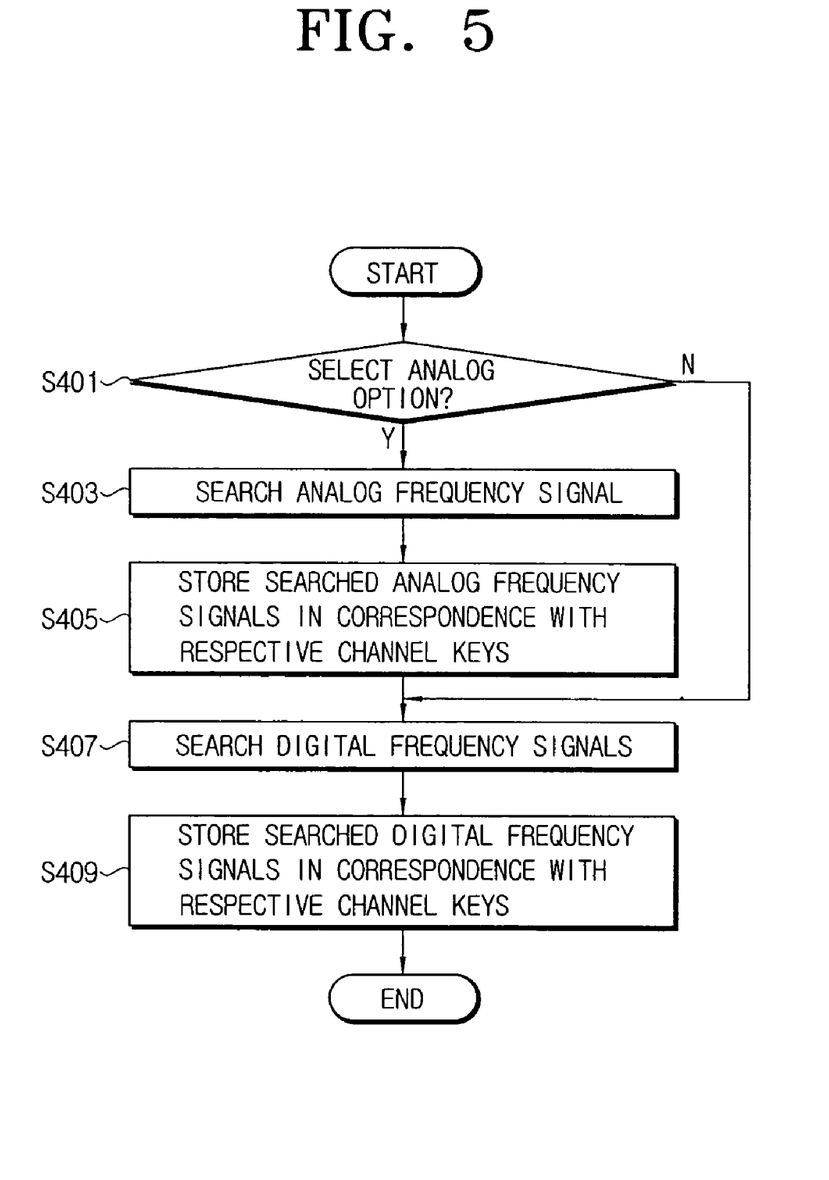
FIG. 5 is a flowchart illustrating a broadcasting signal receiving method of the integrated digital television of FIG. 4 according to an embodiment of the present invention.

FIG. 5 is a flowchart illustrating a broadcasting signal receiving method of the integrated digital television of FIG. 4 according to one embodiment of the present invention. Referring to FIG. 5, the broadcasting signal receiving method of the integrated digital television will be described in greater detail.

The option setting unit 171 provides a menu for selecting whether to search the frequency bandwidth where the analog broadcasting signal is transmitted. The menu provided by the option setting unit 171 is displayed through the display unit 200, so as to receive a selection command from the user.

When the menu for searching the frequency bandwidth of analog broadcasting signals is selected through the option setting unit 171 (S401), the frequency signal search unit 173 searches all the frequency bandwidths of the television broadcasting channels. In this case, the frequency signal search unit 173 first searches the frequency bandwidths of analog broadcasting signals among all the frequency bandwidths of the television broadcasting channels (S403), and stores in the memory 175 the frequency signals of the analog broadcasting signal for the respective corresponding channel keys of the channel selection unit 50 (S405). Next, the frequency signal search unit 173 searches frequency bandwidths for the transmission of digital broadcasting signals among all the frequency bandwidths of the television broadcasting channels (S407), and stores in the memory 175 the searched frequency signals of the respective digital broadcasting channels of the digital broadcasting signals in the same way as described above. Although the frequency signal search unit 173 is configured in the present embodiment to first search the frequency bandwidth of the analog broadcasting signals prior to searching for the frequency band of the digital broadcasting signals, this can be performed in a reversed order.

When a menu of no-search for the frequency bandwidth of the analog broadcasting signal among the menus provided by the option setting unit 171 is selected, the frequency signal search unit 173 searches all the frequency bandwidths of the television broadcasting channels for a frequency bandwidth at which the receivable digital broadcasting signal is transmitted (S407). The frequency signal search unit 173 stores in the memory 175 the frequency signal of the digital broadcasting channel, among the searched frequency bandwidths of the digital broadcasting signals, with respect to respective corresponding channel keys of the channel selection unit 50 (S409). Accordingly, only the frequency bandwidths of the digital broadcasting signals are searched in the case of selecting a menu of no-search for the frequency bandwidth of analog broadcasting signals through the option setting unit 171, and therefore, the channel can be stored very rapidly.

Figure 6:
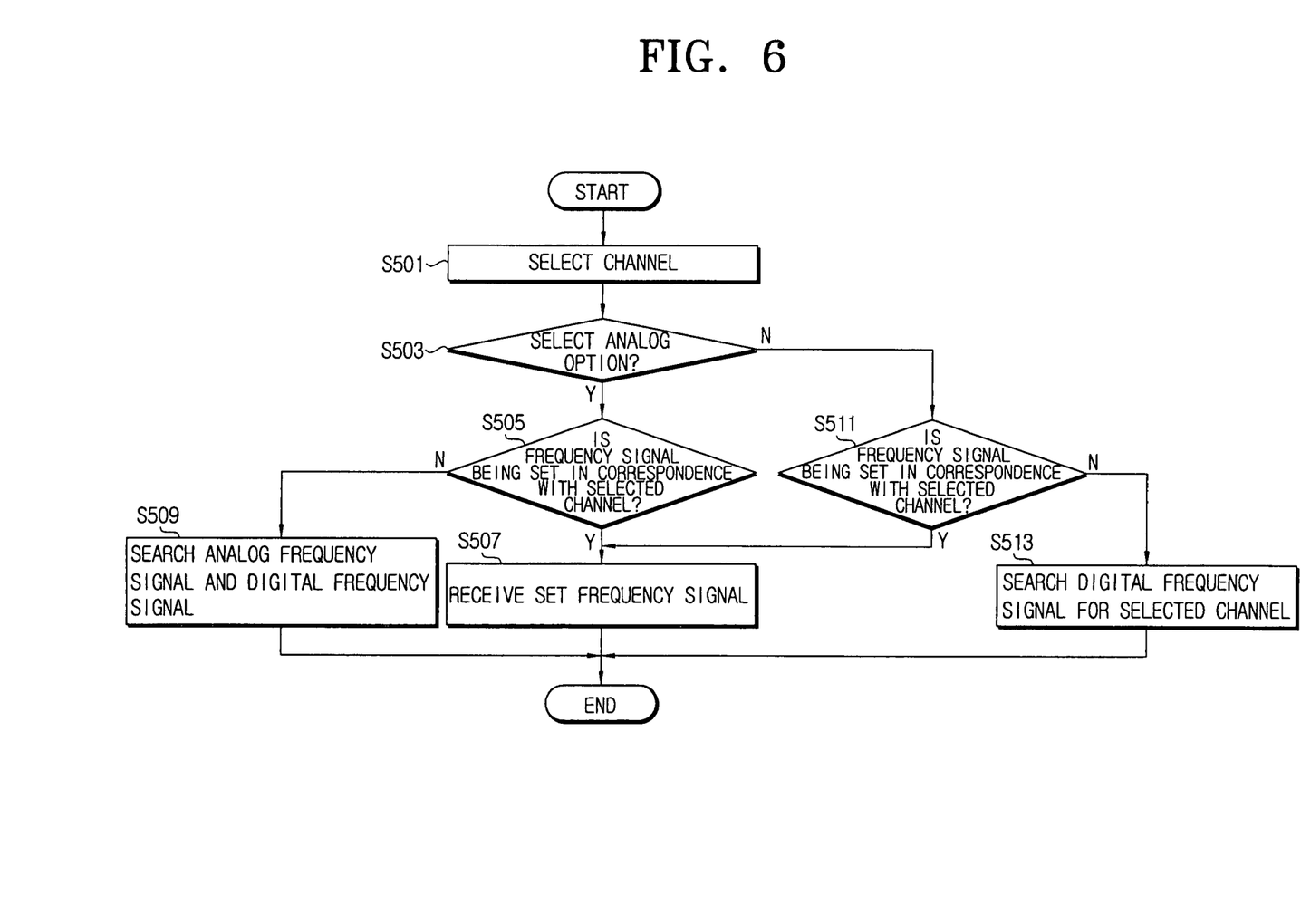
FIG. 6 is a flowchart illustrating a broadcasting signal receiving method of the integrated digital television of FIG. 4 according to an embodiment of the present invention.

FIG. 6 is a flowchart illustrating a broadcasting signal receiving method of the integrated digital television according to another embodiment of the present invention. The broadcasting signal receiving method according to the second embodiment will be described with reference to FIG. 6 in greater detail below.

When the user selects through the channel selection unit 50 one broadcasting channel among the broadcasting channels of analog and digital broadcasting signals (S501), the frequency signal search unit 173 determines whether the reception of an analog broadcasting signal is selected through the option setting unit 171 which provides the menus of the reception of analog broadcasting signals (S503).

When it is determined that the analog broadcasting signal is selected, the frequency signal search unit 173 determines whether a frequency signal is set with respect to the broadcasting channel which is selected through the channel selection unit 50 (S505). As described above, when the reception for the analog broadcasting signal is selected, with respect to the entire frequency bandwidths of the television broadcasting channels, the memory 175 stores a frequency signal of the analog broadcasting channel and the digital broadcasting channel through which analog broadcasting signals and digital broadcasting signals are transmitted, respectively. The frequency signal search unit 173 determines whether a frequency signal corresponding to the selected broadcasting channel is set, by determining whether the memory 175 stores the frequency signal matching with the frequency signal of the broadcasting channel as selected through the channel selection unit 50.

When it is determined that a frequency signal corresponding to the selected broadcasting channel is set, the frequency signal receiving unit 177 receives the analog or digital broadcasting signal, which corresponds to the preset frequency signal (S507).

When it is determined that there is no frequency signal set for the selected broadcasting channel, the frequency signal search unit 173 searches a frequency signal matching with the frequency signal of the selected broadcasting channel, among the entire frequency bandwidths of the television broadcasting channel, i.e., among the frequency bandwidths for the analog broadcasting signals and the digital broadcasting signals (S509). When the frequency signal matching with the frequency signal of the selected broadcasting channel is searched by the frequency signal search unit 173, the frequency signal receiving unit 177 receives analog or digital broadcasting signals from the broadcasting channel that corresponds to the searched frequency signals.

When it is determined that a reception of an analog broadcasting signal is not selected, the frequency signal search unit 173 determines whether there is a frequency signal set for the broadcasting channel selected through the channel selection unit 50 (S511). As described above, when a reception of an analog broadcasting signal is not selected, among the entire frequency bandwidths of the television broadcasting channels, the memory 175 stores a frequency signal of the digital broadcasting channel through which the digital broadcasting signals are transmitted. The frequency signal search unit 173 determines whether a frequency signal corresponding to the selected broadcasting channel is set, by determining whether the memory 175 stores the frequency signal matching with the frequency signal of the broadcasting channel as selected through the channel selection unit 50.

When it is determined that a frequency signal corresponding to the selected broadcasting channel is set, the frequency signal receiving unit 177 receives an analog or digital broadcasting signal, which corresponds to the preset frequency signal (S507).

When it is determined that there is no frequency signal set for the selected broadcasting channel, the frequency signal search unit 173 searches a frequency signal which matches with the frequency signal of the broadcasting channel as selected through the channel selection unit 50 (S513). When a frequency signal, which matches with the frequency signal of the selected broadcasting channel, is searched by the frequency signal searching unit 173 among the entire frequency bandwidths where the digital broadcasting signals are transmitted, the frequency signal receiving unit 177 receives digital broadcasting signals through the broadcasting channel that corresponds with the searched frequency signal. Accordingly, even when there is a channel selection corresponding to the frequency signals that are not set by the channel selection unit 50, the integrated digital television according to the present invention is capable of tuning to the channel efficiently, by searching only the frequency bandwidth having transmission of digital broadcasting signals.

According to the present invention, the user of the integrated digital television can set whether to receive the analog broadcasting signals or not, and therefore, if the user wants to receive the digital broadcasting signals only, or when the transmission of analog broadcasting signals is not in service, without having to search the entire frequency bandwidths, only the frequency bandwidths for the digital broadcasting signals are searched. As a result, the integrated digital television according to the present invention is capable of setting and tuning to a channel efficiently.

Although a few exemplary embodiments of the present invention has been described, it will be understood by those skilled in the art that the present invention should not be limited to the described embodiments, but various changes and modifications can be made within the spirit and scope of the present invention as defined by the appended claims.

What is claimed is:

1. An integrated digital television for receiving an analog broadcasting signal and a digital broadcasting signal, comprising:
   a channel tuning unit; and a broadcasting signal processing unit,
   the channel tuning unit comprising,
      an option setting unit for providing menus for selecting whether to search a frequency bandwidth at which the analog broadcasting signal is transmitted,
      a frequency signal search unit, which searches entire frequency bandwidths at which the digital broadcasting signal is transmitted when the selection is made among the menus provided by the option setting unit for a no-search on the frequency bandwidth of the analog broadcasting signal,
      a storage unit for, among the frequency bandwidths searched by the frequency signal search unit, storing a frequency signal of respective broadcasting channels through which the digital broadcasting signal is transmitted, and
      a broadcasting signal receiving unit for receiving the digital broadcasting signal of the frequency signal which matches with the frequency signal selected by a user among the frequency signals stored in the storage unit; and
   the broadcasting signal processing unit processing the digital broadcasting signal received at the broadcasting signal receiving unit of the channel tuning unit and displaying the processed signal through a display.

2. The integrated digital television of claim 1, further comprising a channel selection unit for receiving a selection command for selecting one broadcasting channel among a plurality of broadcasting channels, and transmitting a frequency signal corresponding to the selected broadcasting channel to the channel tuning unit.

3. A tuner for receiving an analog broadcasting signal and a digital broadcasting signal, comprising:
   an option setting unit for providing menus for selecting whether to search a frequency bandwidth at which the analog broadcasting signal is transmitted;
   a frequency signal search unit for, with a selection on the menus provided by the option setting unit for a menu of no-search for the frequency bandwidth of the analog broadcasting signal, searching entire frequency bandwidths at which the digital broadcasting signal is transmitted;
   a storage unit for storing respective frequency signals of the broadcasting channels for the digital broadcasting signal among the frequency bandwidths selected by the frequency signal search unit and at which the digital broadcasting signal is stored; and
   a broadcasting signal receiving unit for receiving the digital broadcasting signal of the frequency signal which is selected by the user among the frequency signals of the digital broadcasting signals stored at the storage unit.

4. A broadcasting signal receiving method for an integrated digital television which is capable of receiving an analog broadcasting signal and a digital broadcasting signal and receiving a certain type of broadcasting signal which is synchronized to a frequency signal selected by a user, the method comprising the steps of:
   (a) providing menus for selecting whether or not to search a frequency bandwidth at which the analog broadcasting signal is transmitted, and with the selection on the menus for a 'no-search' menu with respect to the frequency bandwidth of the analog bandwidth, searching all the frequency bandwidths at which receivable digital broadcasting signals are transmitted; and
   (b) among the frequency bandwidths being searched in the step (a), storing a frequency signal of a broadcasting channel through which the digital broadcasting signal is transmitted, wherein
   among the frequency signal being stored, the digital broadcasting signal, which corresponds to a frequency signal matching with the frequency signal selected by the user, is received.

5. A broadcasting signal receiving method for an integrated digital television which is capable of receiving an analog broadcasting signal and a digital broadcasting signal and receiving a certain type of broadcasting signal which is synchronized to a frequency signal selected by a user, the method comprising the steps of:
   (a) selecting one among a plurality of broadcasting channels for transmitting the analog broadcasting signal and the digital broadcasting signal;
   (b) determining whether a reception of the analog broadcasting signal is selected through an option setting unit which provides menus for selecting whether or not to receive the analog broadcasting signal; and
   (c) determining whether a frequency signal corresponding to the selected broadcasting channel is set, wherein
   according to the determination of steps (b) and (c), whether or not to search a frequency bandwidth of the analog broadcasting signal and/or the digital broadcasting signal is decided, and according to the decision, receiving a broadcasting signal which corresponds to the frequency signal of the selected broadcasting channel.

6. The broadcasting signal receiving method of claim 5, when the step (b) determines that the reception of the analog broadcasting signal is not selected, and the step (c) determines that there is no frequency signal being set in correspondence with the selected broadcasting channel, further comprising the step of searching all the frequency bandwidths of the digital broadcasting signal for a frequency signal that corresponds to the selected broadcasting channel and receiving a broadcasting signal set corresponding to the searched frequency signal.

7. The broadcasting signal receiving method of claim 5, when the step (b) determines that the reception of the analog broadcasting signal is not selected and the step (c) determines that there is a frequency signal being set in correspondence with the selected broadcasting channel, further comprising the step of receiving a broadcasting signal set corresponding to the set frequency signal.

8. The broadcasting signal receiving method of claim 5, when the step (b) determines that the reception of the analog broadcasting signal is selected and the step (c) determines that there is no frequency signal being set in correspondence with the selected broadcasting channel, further comprising the step of searching all the frequency bandwidths of the analog broadcasting signal and the digital broadcasting signal for a frequency signal which corresponds to the selected broadcasting channel, and receiving a broadcasting signal which corresponds to the searched frequency signal.

9. The broadcasting signal receiving method of claim 5, when the step (b) determines that the reception of the analog broadcasting signal is selected and the step (c) determines that there is a frequency signal being set in correspondence with the selected broadcasting channel, further comprising the step of receiving a broadcasting signal which corresponds to the set frequency signal.

* * * * *